United States Patent [19]

Hoenke

[11] 4,219,536

[45] Aug. 26, 1980

[54] NITRIC ACID PROCESS AND DISPOSAL OF WASTE LIQUIDS CONTAINING AMMONIUM NITRITES

[75] Inventor: Karl A. Hoenke, Novato, Calif.

[73] Assignee: Chevron Research Company, San Francisco, Calif.

[21] Appl. No.: 928,139

[22] Filed: Jul. 26, 1978

[51] Int. Cl.$^2$ ............................ C01B 21/40; C01C 1/18
[52] U.S. Cl. ........................................ 423/393; 423/396
[58] Field of Search ............... 423/235, 393, 395, 396; 71/59

[56] References Cited

U.S. PATENT DOCUMENTS

| | | | |
|---|---|---|---|
| 910,530 | 1/1909 | Halvorsen | 423/385 |
| 1,957,130 | 5/1934 | Bartling et al. | 423/396 |
| 2,072,947 | 3/1937 | Fogler et al. | 423/393 |
| 2,110,431 | 3/1938 | Voogel | 423/396 |
| 2,697,652 | 12/1954 | Ribble et al. | 423/392 X |
| 3,579,298 | 5/1971 | O'Brien et al. | 423/396 |

FOREIGN PATENT DOCUMENTS

| | | | |
|---|---|---|---|
| 2513619 | 2/1975 | Fed. Rep. of Germany. | |
| 6265 | of 1908 | United Kingdom. | |
| 300632 | 8/1929 | United Kingdom | 423/395 |

OTHER PUBLICATIONS

*Supplement to Mellor's Comp. Treatise on Inorg. and Theoretical Chem.* vol. VIII John Wiley and Sons, N. Y. 1968, p. 388.

*Primary Examiner*—G. O. Peters
*Attorney, Agent, or Firm*—D. A. Newell; T. G. DeJonghe; L. S. Squires

[57] ABSTRACT

An improved process for preparing nitric acid. The process is characterized by the steps of (1) contacting gaseous nitrogen dioxide with feed water to yield aqueous liquid nitric acid and a gaseous by-product; (2) contacting the gaseous by-product with ammonia and water to yield a decontaminated gaseous effluent and an aqueous liquid by-product comprising aqueous ammonium nitrate, ammonium nitrite and nitric acid, and (3) feeding the liquid product to the first step above and reducing the amount of said feed water up to an amount equivalent to the water fed in the liquid product. The process is characterized by substantially reduced water consumption and improved pollution control economics and by the innocuous disposal of the hazardous ammonium nitrite.

12 Claims, 2 Drawing Figures

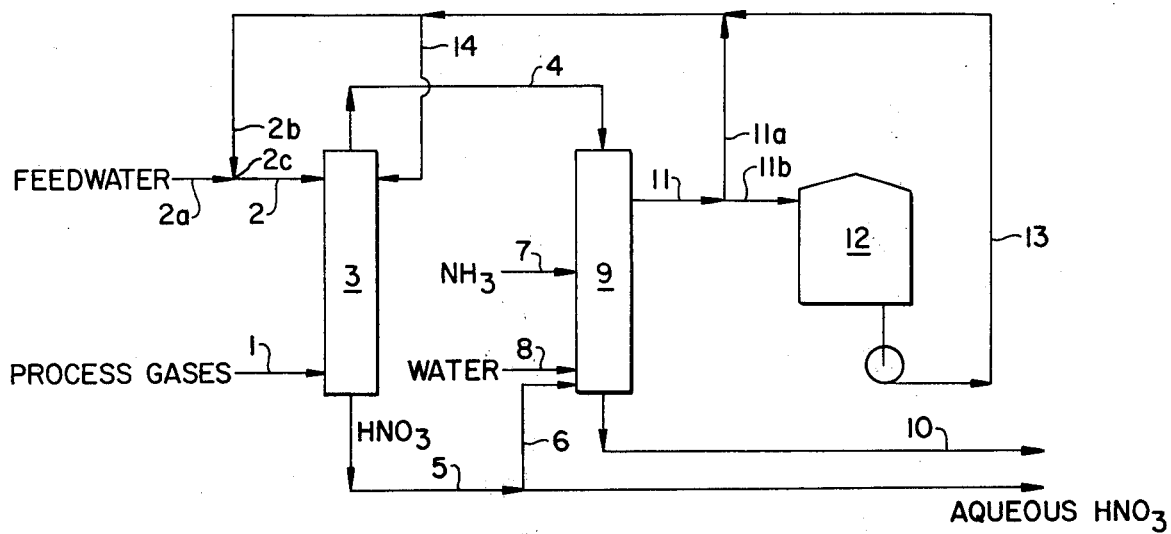
FIG._1.
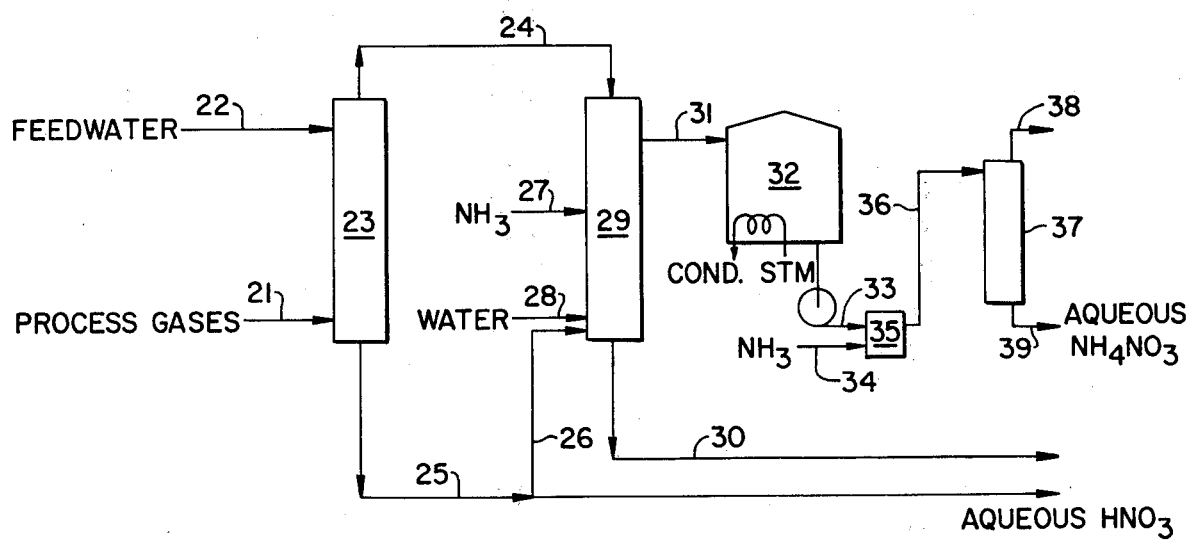
FIG._2.

NITRIC ACID PROCESS AND DISPOSAL OF WASTE LIQUIDS CONTAINING AMMONIUM NITRITES

BACKGROUND OF THE INVENTION

1. The Invention

This invention relates to an improved process for manufacturing nitric acid. In a further aspect, the invention relates to an improved process for preparing nitric acid comprising an improved method of disposing of the nitrogen by-products. In a still further aspect, the invention relates to a improved nitric acid process wherein the amount of treated fresh feed water required is substantially reduced. In another aspect, the invention relates to methods of disposing of liquids containing ammonium nitrites.

2. Prior Art

As is well known, nitric acid is generally prepared by the catalytic oxidation of ammonia with air to yield nitrogen dioxide, which in turn is reacted with water, typically in an absorption column, to yield aqueous nitric acid. Note, for example, page 320 of the test "General Chemistry for Colleges", Smith, Hopkins and Bailar, edit. Heath & Co. (1951), which discusses the primary reactions involved in the basic process, and U.S. Pat. No. 2,697,652, which sets forth in industrial process.

One of the major problems associated with the manufacture of nitric acid is the disposal of waste gas streams and/or waste liquid streams containing various compounds of nitrogen. These compounds are quite undesirable from an environmental standpoint. The gas pollution problem is typically controlled by catalytic abatement or by passing the gases issuing from the nitric acid absorption column through a water scrubber. The catalytic abatement method is necessarily expensive to operate. In the scrubber system, the nitrogen oxides content of the gas is reduced to an acceptable level for disposal to the atmosphere. However, in scrubbing the gas stream, a polluted liquid stream is created. The disposal of this liquid stream issuing from the scrubber is not a simple problem, because the liquid stream contains too high a content of nitrogen compounds (e.g., ammonium nitrate, ammonium nitrite, nitric acid) to permit disposing of it directly to municipal sewer systems or natural bodies of water. Thus, either further processing is required to reduce the nitrogen compound content to an acceptable level, or an alternative use must be made of this liquid. The disposal problem is further compounded by the presence of ammonium nitrite, which presents a hazard because of its instability.

U.S. Pat. No. 3,579,298 teaches, with respect to a combined nitric acid-ammonium nitrate process that one would expect that ammonia-contaminated quench waters could be used in the nitric acid absorption step, but then cautions that if the ammonia present in this quench water reacts with nitric oxide to form ammonium nitrite, "which will not react with the nitric acid but which is a very unstable compound, decomposing in hot water well below 212° F., which ammonium nitrite will move up or down the absorption column, recomposing and decomposing and depositing in pipes or vessels connected to the gas exist of the absorption column, or possibly getting into the final product. Anywhere the ammonium nitrite deposits, it will be intolerable because it is liable to spontaneous decombustion, which may well be hazardous." See Col. 1, line 62-Col. 2, line 7.

In German Patent No. 2,513,619 an improved scrubber system is disclosed for treating the tail gases issuing from the nitric acid absorber. In this treatment, the tail gases are treated with ammonia and water in a scrubber column, yielding an aqueous stream comprising nitric acid, ammonium nitrate and ammonium nitrite. Thus the liquid effluent from this process differs from that from the ammonium quench water referred to in U.S. Pat. No. 3,579,298 in that it does not contain ammonia, but in fact already contains ammonium nitrite. One method used by the art of handling this liquid has been to accumulate the liquid from the scrubber in a heated holding tank wherein the ammonium nitrite is decomposed under controlled conditions to nitrogen and water and then to feed the liquid to an evaporator wherein the ammonium nitrate content of the liquid is concentrated to a degree wherein it can be used in the fertilizer industry. The problem with this process is that it requires a large expenditure of energy, first to initially heat the liquid to decompose the ammonium nitrite and then a further, larger expenditure of energy to evaporate off a substantial amount of water. Also, prior to evaporation the liquid must be neutralized. For example, in typical operation the liquid from the holding tank is first neutralized with ammonia and then concentrated from a combined ammonium nitrate-nitric acid concentration of about 25% by weight to an ammonium nitrate concentration of around 83%. Since it is uneconomical to recover the large amount of water evaporated from the liquid, this water is generally merely vented to the atmosphere along with some ammonia, resulting in an ammonia loss and a substantial water loss and risking further pollution emissions such as ammonium nitrate particulates or aerosol. Further, the fresh feed water used in the process must be treated to remove deleterious ions (e.g., chloride), or render them innocuous. The water loss also generates increased treatment costs.

Thus, it would be very desirable to provide an improved process which would eliminate these energy expenditures and material losses relative to the disposal of waste nitrogen compounds.

Waste gases comprising oxides of nitrogen are, of course, also generated by other industrial processes, such as, for example, pickling, vat cleaning etc. These gases can be disposed of by catalytic abatement or by scrubbing with ammonia and water. Thus, where the scrubbing method is used, a waste liquid stream containing ammonium nitrate and/or ammonium nitrite is created. Thus, it would be desirable to provide a process for economically disposing of such waste liquids.

SUMMARY OF THE INVENTION

In summary, the present invention provides a simple method of eliminating the problems and energy expenditures associated with disposing of the liquid effluent from the scrubber while obviating the ammonium nitrite explosion hazard. The present invention further provides a very substantial savings in the amount of water used by the over-all nitric acid process. The present invention achieves these advantages by feeding the liquid effluent stream from the scrubber column directly with such additional feed water as is necessary, to the nitric acid absorber, thus, both eliminating the energy requirements needed to otherwise process the scrubber stream and, further, very significantly reducing the total amount of treated feed water needed for the nitric acid absorber and the tail gas scrubber. It has been discovered that surprisingly the quantity of ammonium nitrite present in the scrubber stream does not present an explosion hazard, nor does it present the recomposition-decomposition problem described in U.S. Pat. No. 3,579,298. In the present process, it has been found that in the warm, strongly acidic environment of the nitric acid absorber, the ammonium nitrite is innocuously converted to ammonium nitrate and/or decomposed to nitrogen and water.

Thus, in one embodiment, the invention comprises an improved process for preparing nitric acid which comprises:

(a) passing a stream of gases comprising nitrogen dioxide through an absorption zone in contact with water, thereby yielding a liquid product stream comprising aqueous nitric acid and a gaseous effluent comprising gaseous oxides of nitrogen (e.g., nitric oxide);

(b) passing the gaseous effluent from the absorption zone to a scrubbing zone and contacting said gaseous effluent with ammonia and water in said scrubbing zone, to yield a gaseous effluent containing a small amount (preferably less than about 200 ppm [vol.] and most preferably about 100 ppm, by volume, or less) of oxides of nitrogen and a liquid by-product stream comprising aqueous nitric acid, ammonium nitrate and ammonium nitrite; and (c) feeding said by-product liquid stream to said absorption zone and reducing the amount of fresh feed water by an amount up to about the amount of water fed by said by-product liquid stream.

In a further embodiment, it has been discovered that the nitric acid absorber-scrubber system can be advantageously used to dispose of waste streams containing ammonium nitrate and/or ammonium nitrite, provided that the stream does not also contain impurities which would be deleterious to the desired nitric acid product. This embodiment comprises the steps of:

(a) feeding an aqueous waste liquid containing ammonium nitrate and/or ammonium nitrite to an absorption zone and contacting said waste liquid with a gas stream comprising nitrogen dioxide, thereby yielding a liquid product comprising aqueous nitric acid and a minor amount of ammonium nitrate and a gaseous by-product comprising gaseous oxides of nitrogen; and (b) passing said gaseous effluent to a scrubbing zone and contacting said gaseous effluent with ammonia and water in said scrubbing zone to yield a scrubber gas effluent containing a small amount (preferably less than about 200 ppm [vol.] and most preferably about 100 ppm, or less) of oxides of nitrogen and a scrubber liquid by-product stream comprising aqueous nitric acid, ammonium nitrate and ammonium nitrite.

BRIEF DESCRIPTION OF THE DRAWINGS

A further understanding of the invention can be had from the drawings, wherein:

FIG. 1 is a schematic flow sheet illustrating a nonlimiting embodiment of the process of the invention; and FIG. 2 is a schematic flow sheet illustrating a comparison prior art process for preparing nitric acid.

FURTHER DESCRIPTION OF THE INVENTION AND PREFERRED EMBODIMENTS

In the general process for preparing nitric acid, used in the present invention, a process gas stream comprising nitrogen dioxide, typically prepared by the catalytic oxidation of ammonia with air (e.g., $NH_3 + O_2 \rightarrow NO_2 + H_2O$) is contacted with water. The nitrogen dioxide is absorbed by and reacts with the water, yielding an aqueous nitric acid solution (i.e., $NO_2 + H_2O \rightarrow HNO_3 + NO$). Before being used in this process, the water must be treated to remove, or render innocuous, any substances, or ions, which could interfere with the reaction or contaminate the product or cause equipment corrosion. Conveniently, boiler condensate is used, since such water is treated to remove ions prior to boiler use.

The absorption-reaction step is typically conducted in an absorption column by passing the nitrogen dioxide-containing gas upwards through the absorption column countercurrent to a downward flow of water. Reverse flow systems and cocurrent systems could also be used, but typically are less preferred. Both plate columns and packed columns can be used, but generally in larger columns plates are preferred, for better mass transfer and lower pressure drop. The routine design of such equipment and the determination of optimum operating conditions, e.g., flow rates, temperatures, pressures, etc., can be accomplished by routine engineering design procedures and start-up procedures. For example, the nitric acid absorption column is typically operated at temperatures in the range of about from 10° to 50° C. and pressures in the range of about from 40 to 150 psig, preferably about from 75 to 150 psig. Relative flow rates are generally adjusted to provide an aqueous nitric acid product stream having a concentration of about from 50 to 65% by weight $HNO_3$, although obviously other concentrations could be obtained if desired. The gas stream leaving the absorption column typically contains about from 2000 to 5000 ppm, volume, of nitrogen oxides. Since air is generally used as the source of oxygen for the ammonia-oxygen reaction, this gas stream is primarily nitrogen, with some unreacted oxygen.

The exit gas from the absorber is then fed to a scrubbing column wherein it is contacted with ammonia and treated water. The nitrogen oxide gases react with water to form nitric acid and with the ammonia to yield ammonium nitrate and ammonium nitrite. The scrubbing column can be a packed column or a plate column, although here packed columns are preferred. Suitable packing materials which can be used in either or both the absorption column and the scrubber column include, for example, Rashig rings, Berl saddles, intalox saddles, pall rings, Mini-rings, etc. Suitable plate trays which can be used include, for example, bubble cap trays, sieve trays, etc. Flow though the column can be countercurrent or cocurrent. One suitable system which can be used is, for example, described in German Pat. No. 2,513,619. In this system, the column is broken into a number of sections. The gas from the absorber enters the top section of the scrubber and flows downwardly. The treated feed water enters the lower section and flows upwardly and the gaseous ammonia is fed to a middle section of the column. The scrubbed gas exits from the lower section of the column. The design of the scrubber column can be accomplished by applying routine engineering design procedures, and optimum operating conditions can be determined by routine start-up procedures. Typically the scrubber column is operated at temperatures in the range of about from 10 to 70° C. and pressures in the range of about from 30 to 150 psig. Flow rates are preferably adjusted to provide a gaseous effluent containing about 200 ppm by weight of nitrogen oxides or less. The aqueous liquid effluent from the scrubber contains about from 0.1 to 60%, preferably 15 to 25%, by weight, of ammonium nitrate, about from 0.01 to 10%, preferably 0.2 to 1%, by weight, of ammonium nitrite and preferably 1 to 20%, more preferably 2 to 7%, by weight, of nitric acid. The gas flowing from the scrubber contains a sufficiently low concentration of nitrogen oxides that it can be acceptably vented directly to the atmosphere or can be first passed through heat-exchange means and/or used as a driving means for compressors and the like to reclaim some of the energy from the gas prior to exhausting it.

In accordance with the present invention, the liquid stream flowing from the scrubber (commonly referred to as scrubber blowdown) is fed directly back to the nitric acid absorption column, thus permitting the amount of fresh feed water to be reduced by an amount up to the amount contained in the scrubber blowdown. The scrubber blowdown is fed to the upper section of the nitric acid absorption column and can be fed either as a separate stream or first mixed with the fresh feed water. Also, in an alternative embodiment, the scrubber blowdown can supply all of the water to the nitric acid absorption column. In this instance, fresh treated feed water is still supplied to the system via the water fed to the scrubber. Thus, as readily apparent, regardless of the embodiment used, a considerable savings in feed water is obtained. For example, by the present process, reductions in feed water on the order of 10 to 40% can be obtained, and reductions on the order of 25% are typical. Also as explained previously, the ammonium nitrite is safely converted to ammonium nitrate and gaseous nitrogen and water in the acid absorber. Moreover, the nitrogen oxide emissions from the nitric acid absorber are virtually unchanged by the different feed water composition.

In a further modification, the liquid stream issuing from the scrubber can be first fed to a surge tank where it can be accumulated and then pumped to the absorber column. This affords greater control, or flexibility, in the flow rate of the scrubber blowdown to the absorber and provides storage capacity, should it be desirable to shut down the absorber for some reason. Further, where an existing nitric acid scrubber system is being revised in accordance with the present invention, such storage capacity is typically already available in the form of holding tanks used in the prior art processes to decompose ammonium nitrate to nitrogen and water. Thus, the use of such surge tanks frequently merely represents a utilization of existing equipment. Correspondingly, in a new facility the desirability of such surge tanks may not be sufficient to justify their equipment costs.

In a further embodiment, the invention can be applied to the general disposal of waste gas streams comprising oxides of nitrogen. Such streams are generated in various chemical plant operations, such as, for example, pickling operations, cleaning and venting holding tanks or vats, etc. Because of the pollution hazard, such streams are difficult to dispose of for the same reasons as described above with respect to the tail gas from the nitric acid absorber. Such waste gas streams are typically disposed of via catalytic abatement or by passing the gas through a water scrubber. Where a water scrubber is used, the liquid discharge will be contaminated with nitrogen compounds and thus presents another disposal problem. In accordance with the practice of this embodiment, the waste gases are scrubbed in an ammonia-water scrubber, such as for example described above. The waste liquid from this scrubber contains ammonium nitrite and is then fed to the nitric acid absorber in the same manner as described above with respect to the nitric acid scrubber blowdown. Correspondingly the amount of treated fresh water can be reduced by the amount of water supplied with this waste liquid. Where the waste liquid stream also contains free ammonia, it is preferred to add sufficient acid to the stream to acidify the waste stream to a pH of about 4.5 or below, and preferably about 3 or below, as a safety measure. Such waste streams typically contain about from 0.01 to 10% by weight of ammonium nitrite, but typically and preferably contain about from 0.01 to 5%, by weight, of ammonium nitrite. Such waste streams can also contain about from 0.1 to 60%, by weight, ammonium nitrate. The waste liquid should not contain any impurities which could significantly adversely affect the nitric acid process or the quality of the desired nitric acid product.

The disposal of such waste stream in this manner affords further savings in fresh feed water to the nitric acid absorber-scrubber system and moreover results in the reclamation of such waste gases as ammonium nitrate and, of course, eliminates the cost of otherwise disposing of the waste liquid.

Referring now to the drawing, FIG. 1 is a schematic flow sheet of a preferred non-limiting embodiment of the invention. FIG. 2 is a schematic flow sheet of a typical prior art commercial process for preparing nitric acid using a scrubber system for processing waste tail gases, starting with the nitric acid absorber through the scrubber system. For the sake of facilitating comparison, the prior art system will be described first, followed by a description of the improved process of the present invention.

FIG. 2 can, for the sake of reference, be considered as representing a 250-ton-per-day nitric acid plant. About 125,000 pounds per hour of process gas containing about 6%, volume, nitrogen dioxide, obtained for example by the catalytic oxidation of ammonia with air, is fed via line (21) into the bottom section of a bubble-cap tray absorption column (23). At the same time, 8650 pounds per hour of fresh treated feed water is supplied by line (22) to the top section of absorption column (23). The process gas flows countercurrent to the flow of the water through the column and is contacted with, and absorbed by, the water, reacting with the nitrogen dioxide therein to form aqueous nitric acid. The aqueous nitric acid product exits the bottom of absorption column (23) via line (25) wherein it can be used directly for its intended commercial use or accumulated in storage tanks for subsequent use. About 36,873 pounds of 56.5%, by weight $HNO_3$, aqueous nitric acid product is obtained per hour. The unabsorbed gases exit from the top of absorption column (23) via line (24) and are fed to the top of scrubber column (29). The gases leaving absorption column (23) contain about 5000 ppm of mixed oxides of nitrogen, primarily nitric oxide and nitrogen dioxide. Absorption column (23) is a bubble-cap column having an internal diameter of 9.75 feet and an over-all height of 49 feet. The column is operated at a substantially constant temperature of about 35° C. and at a pressure of about 95 psig.

Referring now to scrubber column (29), scrubber column (29) is a 3-bed packed column having an internal diameter of about 9'-8" and an over-all height of about 50'. The column is divided into 3 packed sections of approximately equal height and in each instance packed with 1½" No. 2 Mini-rings. The gas leaving the absorber is fed into the top of the scrubber at a rate of about 100,000 pounds per hour via line (24). Gaseous ammonia is fed to the middle packed bed at a rate of about 220 pounds per hour via line (27) and water is fed into the lower section of the lower packed bed, via line (28), at a rate of about 4510 pounds per hour. A small stream (337 lbs/hr) of aqueous nitric acid is generally diverted, via line (26) from the product stream leaving the absorber to control pH (about from 4.5 to 8 and most preferably about from 5.5 to 7) to prevent ammonia losses. The gaseous scrubber effluent is discharged from the bottom of the scrubber via line (30) and can be either directly vented to the atmosphere or preferably first passed through heat exchangers (not shown) and/or used as a driving force for a compressor (not shown) or the like to reclaim a portion of the energy contained therein, and then vented into the atmosphere. The liquid stream is discharged from the upper bed of scrubber (29) at a rate of 4980 pounds per hour and contains about 19% by weight ammonium nitrate, 5% by weight nitric acid and 1% by weight ammonium nitrite, and the remainder essentially water.

The aqueous liquid from the scrubber is passed via line (10) into a heated holding tank (11). The liquid is maintained in holding tank (11) for a sufficient period of time to ensure that the ammonium nitrite is converted to ammonium nitrate and/or to nitrogen and water, for example, by maintaining the scrubber discharge liquid in the holding tank for about 2 to 8 hours at a temperature of about 35° to 60° C. At this point, the liquid is pumped via line (32) from the holding tank via line (33) to a neutralizer (35) wherein it is neutralized with ammonia supplied via line (34), and then to falling film evaporator (37). In the falling film evaporator the liquid is concentrated to an ammonium nitrate concentration of about 83% weight and discharged via line (39). Operation of the evaporator requires the consumption of about 4200 lbs per hour of 200-psig steam. Water vapor from the evaporator is discharged via line (38) to the atmosphere. Generally, further concentration of the liquid in the falling film evaporator cannot be achieved without loss of some ammonia, aerosol and particulate compounds with the evaporated water. These pollutants would preclude venting of the evaporated water to the atmosphere and would necessitate additional purification steps.

Briefly summarizing, it can be seen that the existing process of the prior art requires about 13,160 pounds of new treated water per hour (8650 pounds to the absorber plus 4510 pounds to the scrubber) and requires the consumption of energy both in the holding tank and especially in the falling film evaporator.

Considering now the process of the present invention, the same basic equipment is used, as described above, with the exception of the omission of the heated holding tank, the neutralizer and the falling film evaporator. Hence, it can be seen in the first instance that the present process requires substantially less equipment. Referring to FIG. 1, a 250-ton-per-day nitric acid plant is again described to facilitate comparison. The absorption column and scrubber columns are operated in the same manner as described above with respect to FIG. 2. 4865 pounds per hour of treated fresh feed water is supplied by line 2a to a mixing tee 2c where it is joined with 4980 pounds per hour of a scrubber liquid by-product containing 3785 pounds of water, 249 pounds of nitric acid, 946 pounds of ammonium nitrate and 50 pounds of ammonium nitrite via line 2b and then fed to absorption column 3 via line 2. (In an alternative embodiment, the scrubber liquid by-product could be fed to absorption column 3 via a separate line 14.)

The same composition process gas as used with respect to FIG. 2 is fed to absorber 3 via line 1 at a rate of about 125,000 pounds per hour. Aqueous nitric acid is removed from the bottom of absorber 3 via line 5 at a flow rate of 38,130 pounds per hour. The aqueous nitric acid product contains 55.3% weight nitric acid, 2.6% weight ammonium nitrate and only negligible (below 0.01%), if any, amounts of ammonium nitrite. (The ammonium nitrite fed to the absorber with the feed water is converted to ammonium nitrate and nitrogen and water in the absorber.) Effluent gases containing about 5000 ppm of nitrogen oxide gases, e.g., NO and $NO_2$, are discharged from the top of the absorber via line 4 and are fed directly into scrubber 9 at about 100,000 pounds per hour.

220 lbs/hr of ammonia is fed to scrubber 9 via line 7. 4510 lbs/hr of water is fed to the scrubber 9 via line 8. Also, as described with respect to FIG. 2, a small portion of the aqueous nitric acid product (i.e., 337 lbs/hr) is fed to scrubber 9, via line 6, to control pH and prevent ammonia losses. The scrubbed effluent gas, containing about 200 ppm, by volume, or less of mixed nitrogen oxides, exits scrubber 9 via line 10 and can be discharged to the atmosphere or preferably can be first used as the driving force for heat exchangers and/or compressors, etc., to reclaim some of the energy from this gas. The liquid stream is discharged from scrubber 9 at a rate of about 4980 pounds per hour, and contains about 19% weight ammonium nitrate, 5% weight nitric acid and 1% weight ammonium nitrite. The liquid stream leaves scrubber 9 via line 11 and is fed directly via lines 11a, 2b, 2c (tee) and 2 back to absorber 3 or alternatively is accumulated in surge tank 12 via line 11b and then pumped back to absorber 3 via lines 13, 2b, 2c (tee) and 2 or lines 13 and 14. Surge tank 12 could also be equipped with a steam coil or other heating means as a safety measure in the event that it became necessary to store the ammonium nitrite-containing stream in the surge tank.

As can be seen by comparing the processes described with respect to FIG. 1 and FIG. 2, the process of the present invention eliminates the need for the neutralizer and the energy-consuming heated holding tank and evaporator. By comparing the feed requirements of the two processes, it can be seen that the process of the present invention only requires 9375 pounds of treated fresh water per hour, whereas the comparison prior art process of FIG. 2 requires about 13,160 pounds per hour. Thus, a savings of about 3785 pounds per hour or a percentage reduction of about 29% is obtained. Along with this, an energy savings in excess of 4200 pounds of 200-psig steam per hour is also obtained. Also, where the nitric acid is intended to be used to make ammonium nitrate, the added pressure of ammonium nitrate in the aqueous nitric acid from the absorber permits a more concentrated ammonium nitrate solution to be made upon neutralization with ammonia and, of course, effects reclamation of nitric oxides, in the form of ammonium nitrate, which would otherwise be discarded.

Although the invention has been described with respect to specific equipment in the above description of the preferred embodiments, it should, of course, be appreciated that the process has broad applicability and that other suitable equipment and operating conditions could be used.

Obviously, many variations and modifications of the invention, described hereinabove and below in the claims, can be made without departing from the essence and scope thereof.

What is claimed is:

1. In the process for preparing nitric acid which comprises the steps of:
   (a) contacting a gaseous stream comprising nitrogen dioxide with water in an absorption zone, thereby yielding a gaseous by-product comprising oxides of nitrogen and a liquid product comprising aqueous nitric acid; and
   (b) contacting said gaseous by-product with ammonia and water in a scrubber zone, thereby yielding a gaseous scrubber effluent comprising a small amount of nitrogen oxides and an aqueous liquid scrubber product comprising ammonium nitrate, nitric acid and ammonium nitrite;

the improvement which comprises:
   feeding at least the major portion of said aqueous liquid scrubber product to said absorption zone and substantially reducing the amount of new water fed to said absorption zone by about an amount substantially corresponding to the water contained in the liquid scrubber product fed to said absorption zone thereby substantially reducing the total amount of water required by said nitric acid process and innocuously transforming the ammonium nitrite fed to said absorption zone to ammonium nitrate, nitrogen and water.

2. The process of claim 1 wherein substantially all of said aqueous liquid scrubber product is fed to said absorption zone.

3. The process of claim 2 wherein said gaseous scrubber effluent comprises less than about 200 ppm (volume) of nitrogen oxides.

4. The process of claim 2 wherein said aqueous nitric acid product consists essentially of about from 50 to 65% weight $HNO_3$, about from 0.5 to 5% weight ammonium nitrate, and the remainder water.

5. The process of claim 1 wherein said absorption zone is operated at temperatures in the range of about 0° to 50° C. and pressures in the range of about from 40 to 150 psig.

6. The process of claim 1 wherein said scrubber zone is operated at temperatures in the range of about from 0° to 70° C. and pressures in the range of about from 30 to 150 psig.

7. The process of claims 1 or 2 wherein said scrubber zone comprises at least one packed bed.

8. The process of claim 7 wherein said scrubber zone comprises three vertically oriented packed beds one above the other, and wherein said gaseous product from said absorption zone is fed into about the top of the uppermost packed bed; gaseous ammonia is fed into the middle packed bed and water is fed into the lower bed, and wherein said gaseous scrubber product is withdrawn from about the bottom of the lowest packed bed and said aqueous liquid scrubber product is withdrawn from said uppermost bed at a location below the entrance of the gaseous product from said absorption zone.

9. The process of claim 1 wherein said gaseous stream of step (a) comprises at least one other gaseous oxide of nitrogen in addition to said nitrogen dioxide.

10. The process of claim 1 wherein said gaseous stream, of step (a), consists essentially of the gaseous product obtained by the catalytic oxidation of ammonia with air.

11. The process of claim 8 wherein sufficient nitric acid is supplied to said lower scrubber bed to control the pH of the liquid leaving said lower scrubber bed to about from 4.5 to 8 to reduce ammonium losses.

12. The process of claim 1, wherein said process comprises feeding an aqueous waste stream comprising ammonium nitrite, ammonium nitrate or mixtures thereof, to said absorption zone.

* * * * *